(12) United States Patent
Huang et al.

(10) Patent No.: US 12,143,926 B2
(45) Date of Patent: Nov. 12, 2024

(54) CONTROL METHOD FOR AUTOMATIC CLEANING EQUIPMENT

(71) Applicant: Hobot Technology Inc., Chupei (TW)

(72) Inventors: Chung-Yuan Huang, Zhubei (TW); Chui-Yao Yang, Zhubei (TW)

(73) Assignee: HOBOT TECHNOLOGY INC., Chupei (TW)

( * ) Notice: Subject to any disclaimer, the term of this patent is extended or adjusted under 35 U.S.C. 154(b) by 377 days.

(21) Appl. No.: 17/738,904

(22) Filed: May 6, 2022

(65) Prior Publication Data

US 2022/0417835 A1 Dec. 29, 2022

(30) Foreign Application Priority Data

Jun. 4, 2021 (TW) ................................ 110120486

(51) Int. Cl.
| | |
|---|---|
| *H04W 48/16* | (2009.01) |
| *H04W 4/33* | (2018.01) |
| *H04W 4/40* | (2018.01) |
| *H04W 48/00* | (2009.01) |
| *H04W 88/04* | (2009.01) |

(52) U.S. Cl.
CPC ............. *H04W 48/16* (2013.01); *H04W 4/33* (2018.02); *H04W 4/40* (2018.02); *H04W 48/17* (2013.01); *H04W 88/04* (2013.01)

(58) Field of Classification Search
CPC ......... H04W 48/16; H04W 4/33; H04W 4/40; H04W 48/17; H04W 88/04; H04W 84/12; H04W 88/06; H04W 4/80; H04W 12/50; H04W 84/005; G05B 19/0423; G05B 2219/25257; H04L 67/104
See application file for complete search history.

(56) References Cited

U.S. PATENT DOCUMENTS

| | | | | |
|---|---|---|---|---|
| 2014/0316636 | A1* | 10/2014 | Hong | .................... G05D 1/0274 901/1 |
| 2019/0075093 | A1* | 3/2019 | Anderson | ........... H04L 63/0876 |
| 2023/0355072 | A1* | 11/2023 | Li | .......................... A47L 11/294 |

* cited by examiner

*Primary Examiner* — Thai Nguyen
(74) *Attorney, Agent, or Firm* — Muncy, Geissler, Olds & Lowe, P.C.

(57) ABSTRACT

The present disclosure provides a control method for an automatic cleaning equipment, wherein the automatic cleaning equipment includes a mobile device and a self-propelled cleaning device, in which the mobile device is used as a wireless network device to enable the self-propelled cleaning device to communicate with a hotspot function of the mobile device through a wireless network technology, the self-propelled cleaning device is connected to the cloud server through a mobile communication signal of the mobile device, and also the mobile device is connected to the cloud server by using a mobile communication technology.

14 Claims, 12 Drawing Sheets

CONTROL METHOD FOR AUTOMATIC CLEANING EQUIPMENT

BACKGROUND OF THE INVENTION

1. Field of the Invention

The present disclosure relates to a control method for an automatic cleaning equipment, and more particularly to a control method for an automatic cleaning equipment capable of using a mobile phone as a wireless network device to enable a self-propelled cleaning device to communicate with a cloud server through the mobile phone while the mobile phone communicates with the cloud server so as to control the self-propelled cleaning device through the mobile phone.

2. Description of the Related Art

FIG. 1 is a schematic view showing a communication method between a self-propelled cleaning device and a cloud server in the prior art. As shown in FIG. 1, a user uses the mobile phone 110 to search for a WIFI network device 131, and then sends the account name and password of the found WIFI network device 131 to the self-propelled cleaning device 120, such that the self-propelled cleaning device 120 can communicate with the cloud server 150 through the WIFI network device 131 and Internet 140. Specifically, the steps are illustrated as follows.

The mobile phone 110 is connected to the WIFI network device 131 (such as a router), so that the mobile phone 110 can normally access the Internet through the WIFI network device 131. At this time, the mobile phone 110 has stored the account name and password of the WIFI network device 131 (step S80). Then, the application APP of the mobile phone 110 is used to add the process of adding a self-propelled cleaning device 120 so as to determine whether to turn on the WIFI module and the Bluetooth module at the same time (step S81). The application APP uses the Bluetooth module to enter the pairing mode and automatically finds out the account name and password of the WIFI network device 131 in the mobile phone 110. When the account name and password of the WIFI network device 131 are not found, the user is required to manually input the account name and password of the WIFI network device 131 (step S82).

After the Bluetooth module of the mobile phone 110 is paired with the self-propelled cleaning device 120, the account name and password of the WIFI network device 131 stored in the mobile phone 110 are transmitted to the self-propelled cleaning device 120 through Bluetooth transmission, such that the control unit of the self-propelled cleaning device 120 can communicate with the WIFI network device 131 by using the account name and password of the WIFI network device 131 (step S83).

Subsequently, the self-propelled cleaning device 120 communicates with the cloud server 150 through the WIFI network device 131 and the Internet 140 (step S84). The cloud server 150 notifies the mobile phone 110 through the WIFI network device 131 that the pairing is successful, and the cloud server 150 also notifies the self-propelled cleaning device 120 through the WIFI network device 131 that the pairing is successful (step S85). After completing the pairing process of the mobile phone 110 and the self-propelled cleaning device 120, the mobile phone 110 can directly control the self-propelled cleaning device 120 through the WIFI network device 131, the Internet 140 and the cloud server 150 (step S85).

However, when there is no WIFI network device 131 that can communicate with the Internet 140 via an asymmetric digital subscriber line (ADSL) or optical fiber in the user's room, the mobile phone 110 and the self-propelled cleaning device 120 cannot be paired through the cloud server 150, and the mobile phone 110 cannot be used to control the self-propelled cleaning device 120.

FIG. 2 is a schematic view showing another communication method between a self-propelled cleaning device and a cloud server in the prior art. In order to solve the aforementioned problem, the user can obtain another mobile phone 132, enable the hotspot function of the mobile phone 132, and simulate the mobile phone 132 as a WIFI network device 131, such that the mobile phone 110 and the self-propelled cleaning device 120 can be paired through the cloud server 150, and thus the mobile phone 110 can be used to control the function of the self-propelled cleaning device 120.

However, according to the aforementioned method, two mobile phones are required, one is used to simulate the WIFI network device 131, and the other is the mobile phone 110 used to control the self-propelled cleaning device 120. It is impossible to use only one mobile phone 110 to simultaneously make the self-propelled cleaning device 120 communicate with the cloud server 150, and control the self-propelled cleaning device 120 by the mobile phone 110.

BRIEF SUMMARY OF THE INVENTION

The present disclosure provides a control method for an automatic cleaning equipment, which includes a mobile device and a self-propelled cleaning device, wherein the mobile device has a hotspot function and a mobile communication function. The control method includes steps of:

transmitting, by the mobile device, an account name and a password of the hotspot function to the self-propelled cleaning device, and enabling the hotspot function of the mobile device;

using, by the self-propelled cleaning device, the account name and the password of the hotspot function to communicate with the mobile device using a wireless network technology through the hotspot function of the mobile device, and then communicating with a cloud server with a mobile communication technology through the mobile communication function of the mobile device; communicating, by the mobile device, with the cloud server through the mobile communication technology;

receiving, by the mobile device, a pairing success signal from the cloud server, wherein the paring success signal indicates that both the mobile device and the self-propelled cleaning device are capable of communicating with the cloud server; and transmitting, by the mobile device, a cleaning command signal to the self-propelled cleaning device through the cloud server, so as to control the self-propelled cleaning device such that the self-propelled cleaning device performs cleaning according to the cleaning command signal.

The cleaning command signal is transmitted to the cloud server by the mobile device using the mobile communication technology, then received by the mobile device from the cloud server using the mobile communication technology, and then transmitted to the self-propelled cleaning device by the mobile device using the wireless network technology.

It is an object of the present disclosure to provide a control method for an automatic cleaning equipment capable of using a mobile phone as a wireless network device to enable a self-propelled cleaning device to communicate with a cloud server through the mobile phone while the mobile phone communicates with the cloud server so as to control the self-propelled cleaning device through the mobile phone.

DETAILED DESCRIPTION OF THE INVENTION

According to an embodiment of the present disclosure, a control method for an automatic cleaning equipment is provided, wherein a mobile device 210 is used as a wireless network device such that a self-propelled cleaning device 220 communicates to a cloud server 250 through a hotspot function and a mobile communication function of the mobile device 210, while the same mobile device 210 communicates to the cloud server 250 through the mobile communication function such that the mobile device 210 is paired with the self-propelled cleaning device 220 through the cloud server 250, and thus the mobile device 210 can be used to control the self-propelled cleaning device 220 by transmitting signals such as cleaning data or cleaning commands through the cloud server 250. According to an embodiment of the present disclosure, by using the application APP, through the improvement of the control process and the control program, the user is guided to make appropriate settings, such that only by using the same mobile device 210, the mobile device 210 and the self-propelled cleaning device 220 can be paired through the cloud server 250, and the mobile device 210 can be used to control the self-propelled cleaning device. In an embodiment, the mobile device 210 can be a cell phone, a tablet or a mobile phone.

In an embodiment, before completing the pairing between the mobile device 210 and the self-propelled cleaning device 220, the communication technology between the mobile device 210 and the self-propelled cleaning device 220 includes using WiFi (for example, the first embodiment of the following step S01), Bluetooth (for example, the second embodiment of the following step S01), etc. for communication.

In an embodiment, after completing the pairing between the mobile device 210 and the self-propelled cleaning device 220, the communication technology between the hotspot function of the mobile device 210 and the self-propelled cleaning device 220 includes using WiFi for communication. The communication technology between the mobile communication function of the mobile device 210 and the cloud server 250 includes but is not limited to 2G (GSM), 2.5G (GPRS), 3G (WCDMA, TD-SCDMA, CDMA2000, UTMS), WiMax, 4G (LTE), 4G+ (LTE+), 5G or future-developed technologies and other mobile cellular networks for communication.

In this specification, the mobile communication technology refers to 2G (GSM), 2.5G (GPRS), 3G (WCDMA, TD-SCDMA, CDMA2000, UTMS), WiMax, 4G (LTE), 4G+(LTE+), 5G or technologies developed in the future. The wireless network refers to a wireless area network technology based on the IEEE 802.11 standard, or a future development technology based on the IEEE 802.11 standard. Further, the wireless network device can be a wireless access point (AP) or a wireless route.

Figure 1:
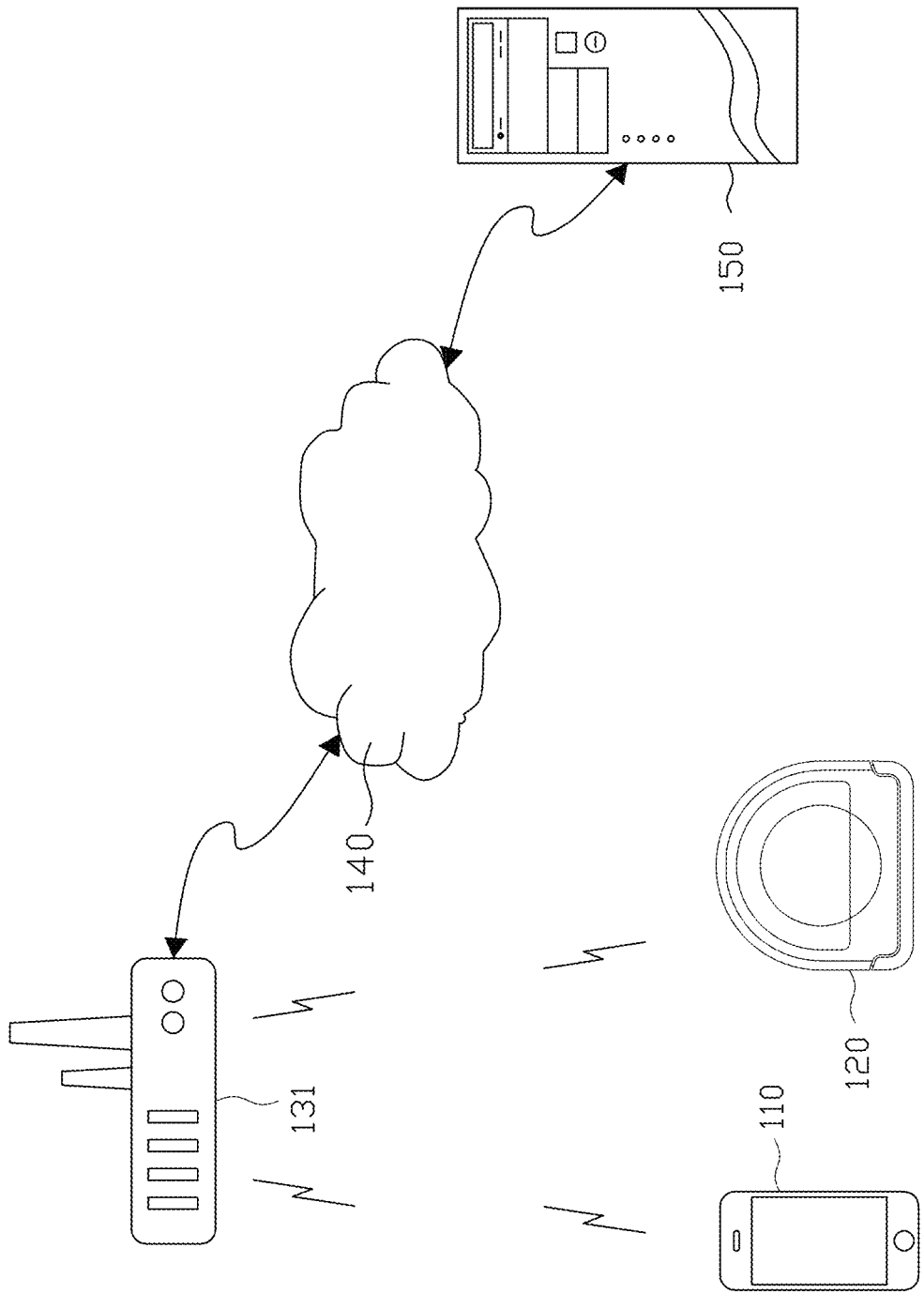
FIG. 1 is a schematic view showing a communication method between a self-propelled cleaning device and a cloud server in the prior art.
Figure 2:
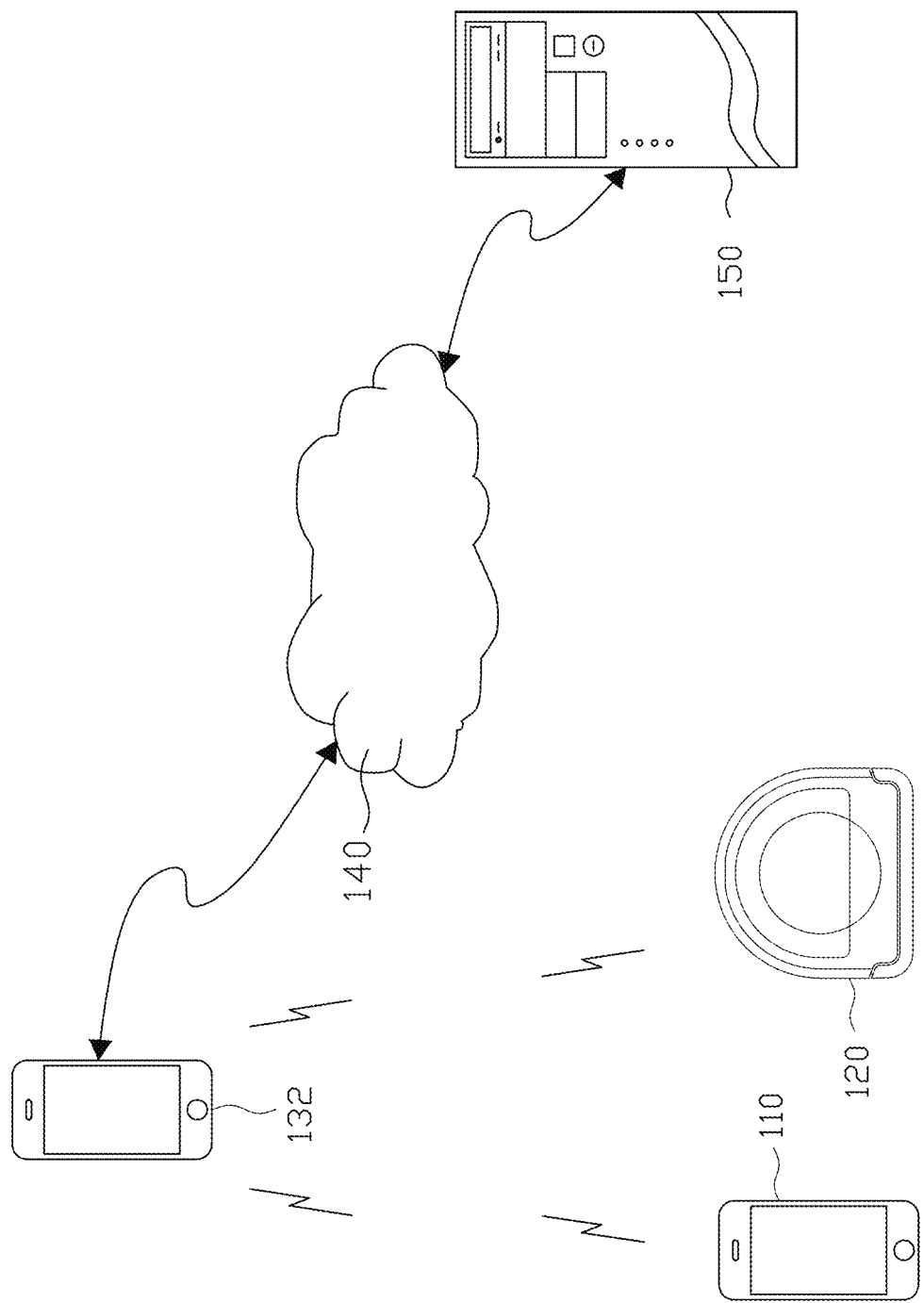
FIG. 2 is a schematic view showing another communication method between a self-propelled cleaning device and a cloud server in the prior art.
Figure 3:
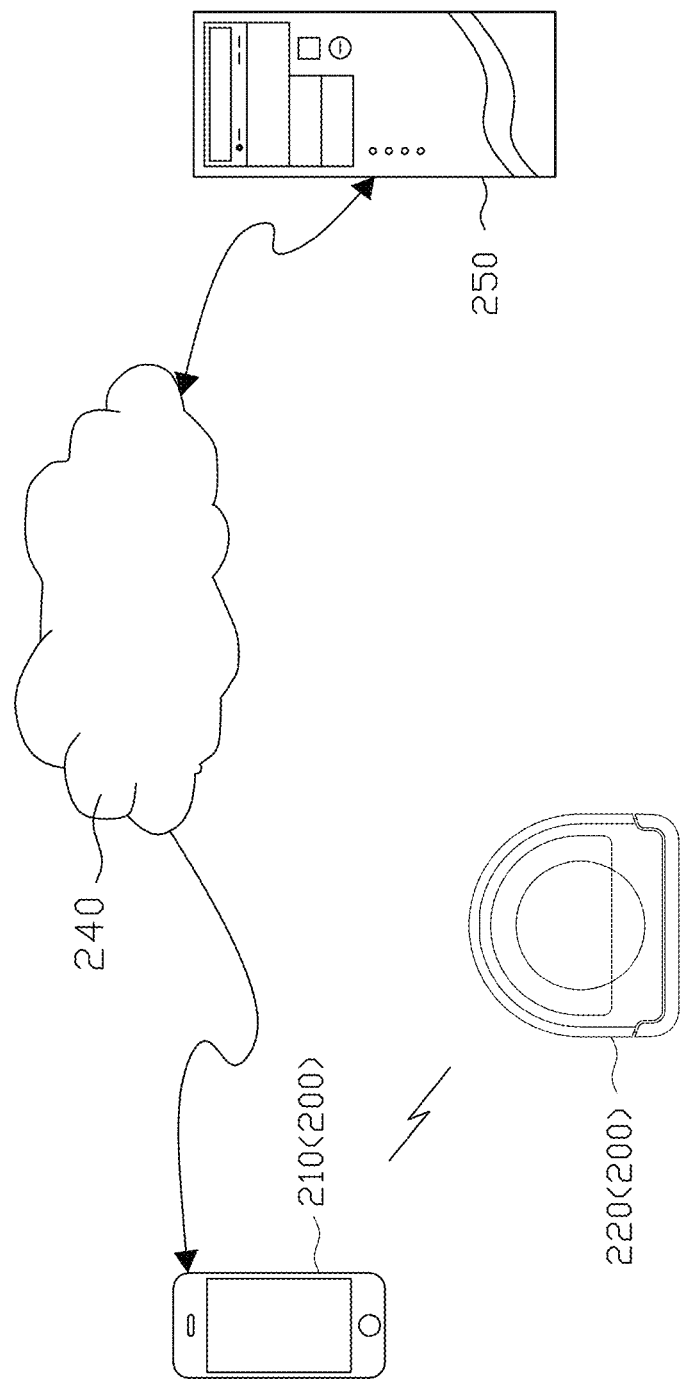
FIG. 3 is a schematic view showing a communication method between a self-propelled cleaning device and a cloud server according to an embodiment of the present disclosure.
Figure 6:
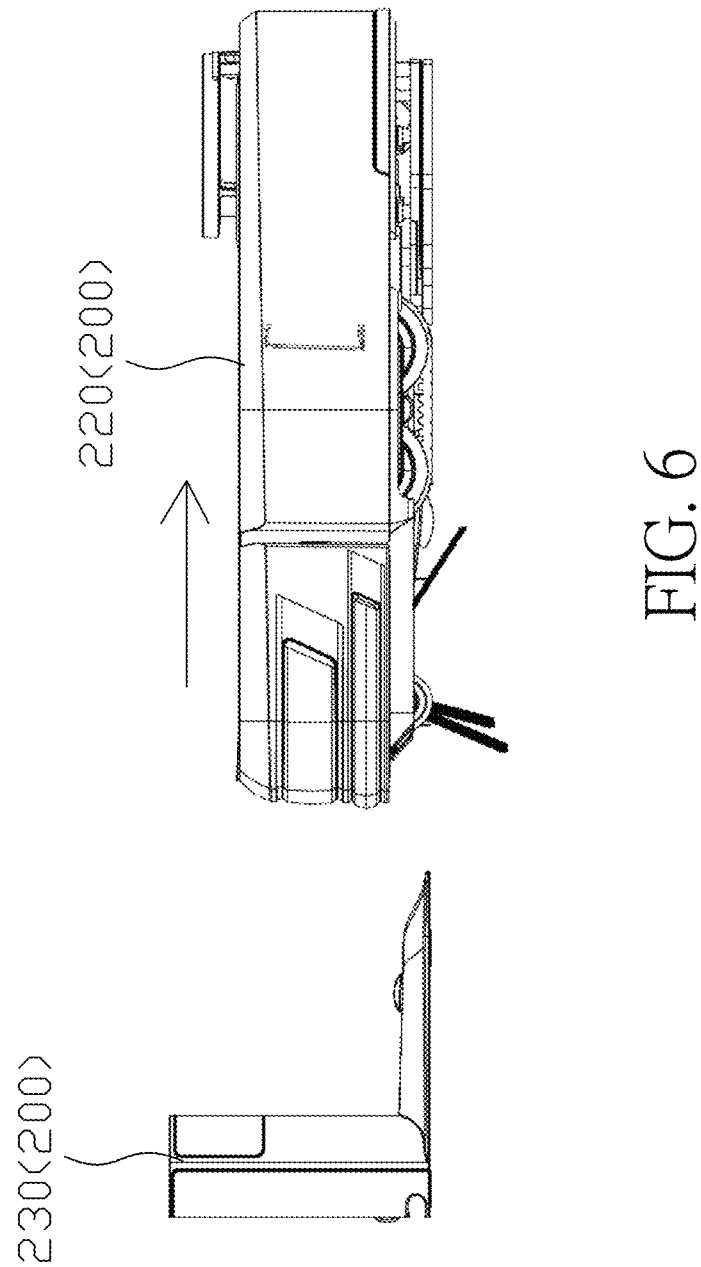
FIG. 6 is a schematic view showing the self-propelled cleaning device leaving the fixed charging stand according to the schedule of the cleaning command signal according to an embodiment of the present disclosure.

According to an embodiment of the present disclosure, a control method for an automatic cleaning equipment is provided. FIG. 3 is a schematic view showing a communication method between a self-propelled cleaning device and a cloud server according to an embodiment of the present disclosure. As shown in FIG. 3, the automatic cleaning equipment 200 includes a mobile device 210 and a self-propelled cleaning device 220. The mobile device 210 has a hotspot function and a mobile communication function. In an embodiment, the mobile device 210 includes a WIFI device, and when the WIFI function is enabled, the hotspot function cannot be used, and when the hotspot function is enabled, the WIFI function cannot be used. In an embodiment, preferably, the mobile device 210 is installed with an application program APP, and the mobile device 210 guides the execution of the control method for the automatic cleaning equipment through the application program APP. The mobile device 210 communicates with the cloud server 250 through the Internet 240. In an embodiment, preferably, the automatic cleaning equipment 200 further includes a fixed charging stand 230 (as shown in FIG. 6).

Figure 4A:
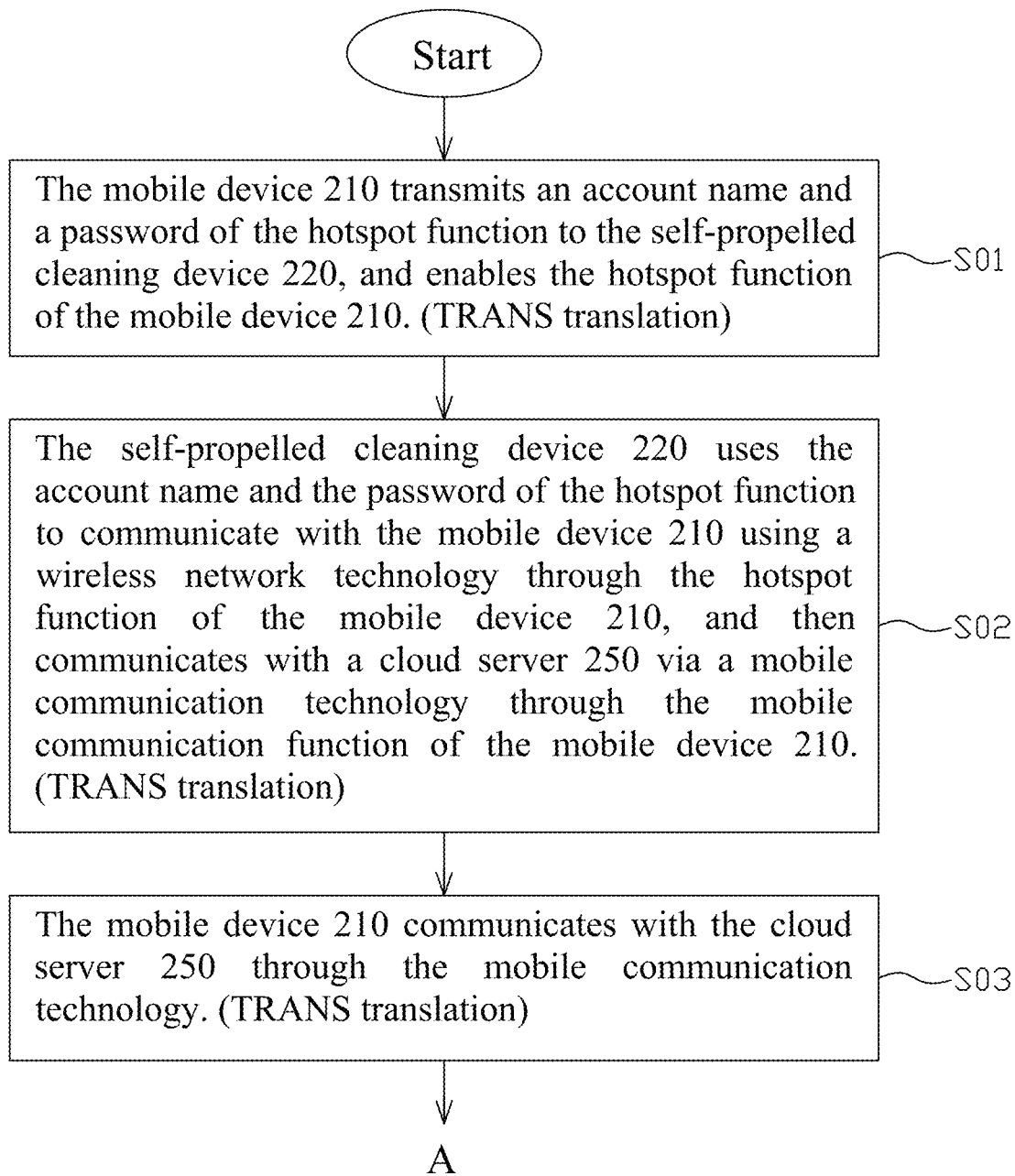
FIGS. 4A-4B is a flow chart showing a control method for an automatic cleaning equipment according to an embodiment of the present disclosure.
Figure 4B:
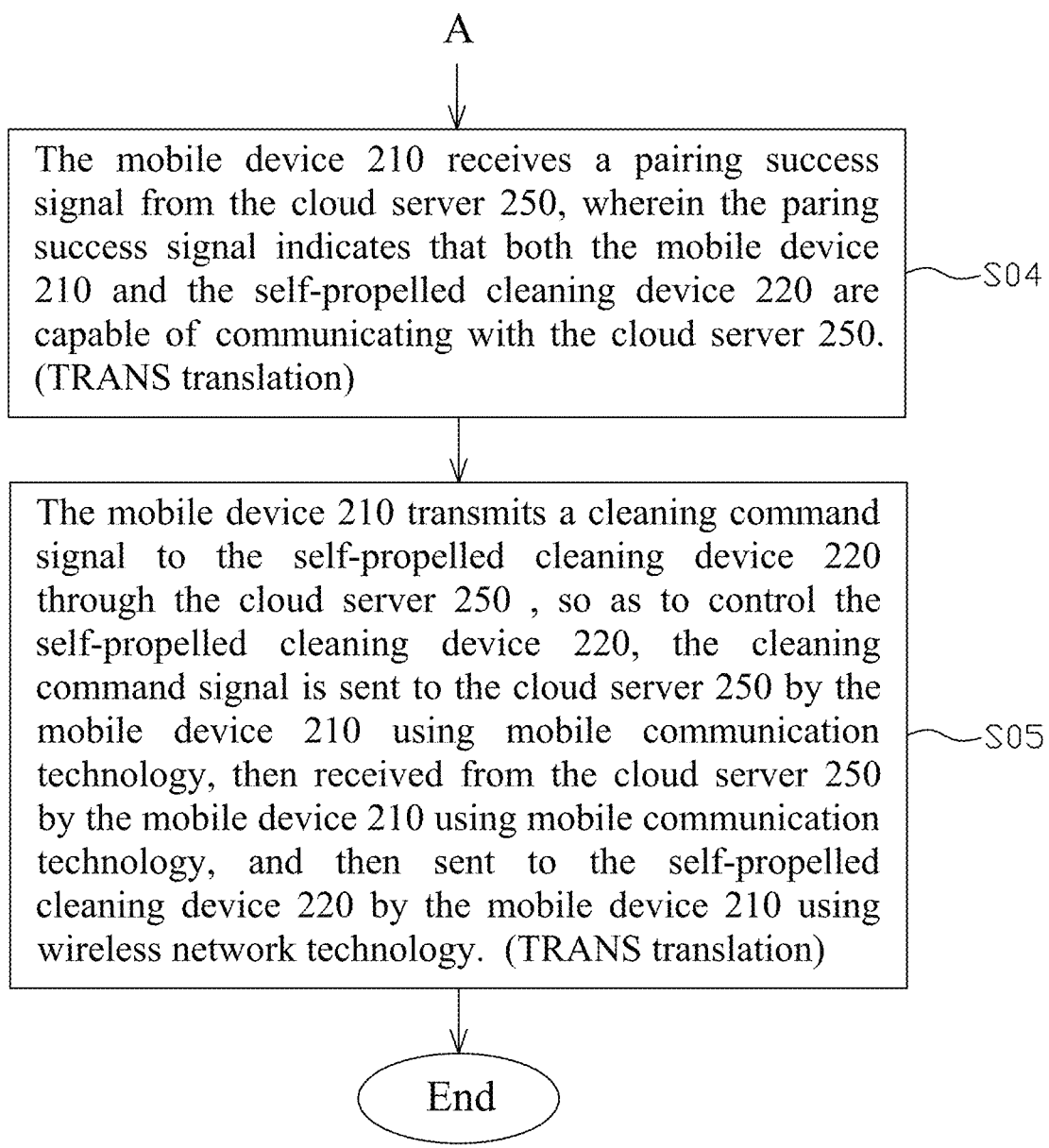

FIGS. 4A-4B is a flow chart showing a control method for an automatic cleaning equipment according to an embodiment of the present disclosure. In an embodiment, the control method for the automatic cleaning equipment includes the following steps.

Step S01: the mobile device 210 transmits an account name and a password of the hotspot function to the self-propelled cleaning device 220, and enables the hotspot function of the mobile device 210.

Step S02: the self-propelled cleaning device 220 uses the account name and the password of the hotspot function to communicate with the mobile device 210 using a wireless network technology through the hotspot function of the mobile device 210 (i.e., the self-propelled cleaning device 220 communicates with the mobile device 210 through the WIFI signal), and then communicates with a cloud server 250 via a mobile communication technology through the mobile communication function of the mobile device 210 (i.e., the mobile deice 210 communicates with the cloud server 250 through the mobile communication signal).

Step S03: the mobile device 210 communicates with the cloud server 250 through the mobile communication technology.

Step S04: the mobile device 210 receives a pairing success signal from the cloud server 250, wherein the paring success signal indicates that both the mobile device 210 and the self-propelled cleaning device 220 are capable of communicating with the cloud server 250.

Step 505: the mobile device 210 transmits a cleaning command signal to the self-propelled cleaning device 220 through the cloud server 250, so as to control the self-propelled cleaning device 220, the cleaning command signal is sent to the cloud server 250 by the mobile device 210 using mobile communication technology, then received from the cloud server 250 by the mobile device 210 using mobile communication technology, and then sent to the self-propelled cleaning device 220 by the mobile device 210 using wireless network technology. In an embodiment, the mobile device 210 further transmits the cleaning command signal to the self-propelled cleaning device 220 through the cloud server 250 according to the pairing success signal.

In an embodiment, the control method for the automatic cleaning equipment further includes the following steps.

Step S06: the self-propelled cleaning device 220 obtains a cleaning device information, and transmits the a cleaning device information to the cloud server 250, wherein the cleaning device information is transmitted to the mobile device 210 by the self-propelled cleaning device 220 through the hotspot function of the mobile device 210 using the wireless network technology, and then transmitted to the cloud server 250 by the mobile device 210 through the mobile communication function using the mobile communication technology. In an embodiment, the self-propelled cleaning device 220 further transmits the cleaning device information to the cloud server 250 according to the pairing success signal. In an embodiment, the pairing success signal includes an identification code (ID) specifically assigned to the self-propelled cleaning device 220 by the cloud server 250, such that after the mobile device 210 and the self-propelled cleaning device 220 provide the identification code (ID) to the cloud server 250, the cloud server 250 can provide the mobile device 210 or the self-propelled cleaning device 220 with information such as the cleaning command signal Sc or the cleaning device information data belonging to the identification code (ID).

Step S07: the mobile device 210 receives the cleaning device information from the cloud server 250 through the mobile communication technology.

The operation of the cloud server 250 in step S04 in another embodiment will be described in detail as follows. After the cloud server 250 confirms that it can communicate with the self-propelled cleaning device 220 and the mobile device 210, it sends a pairing success signal Sa to notify the self-propelled cleaning device 220 that the pairing is successful, and the cloud server 250 also sends a pairing success signal Sa to notify the mobile device 210 that the pairing is successful. At this time, the pairing success signal Sa is transmitted to the mobile device 210 by the cloud server 250 through the mobile communication technology, and then transmitted to the self-propelled cleaning device 220 by the hotspot function of the mobile device 210 through the wireless network technology; also, the pairing success signal Sa is transmitted to the mobile device 210 by the cloud server 250 through the mobile communication technology. In addition, the communication between the cloud server 250 and the self-propelled cleaning device 220 is performed by or through the mobile device 210, using the wireless network technology to communicate with the mobile device 210, and then using the mobile communication technology to communicate with the cloud server 250.

In addition, in an embodiment, after the pairing success signal Sa is transmitted from the cloud server 250 to the mobile device 210 through the mobile communication technology, and then transmitted to the self-propelled cleaning device 220 by the hotspot function of the mobile device 210 through the wireless network technology, the self-propelled cleaning device 220 transmits the pairing success signal Sa to the mobile device 210. More specifically, in an embodiment, the mobile device 210 does not receive the pairing success signal Sa from the cloud server 250, but receives the pairing success signal Sa from the self-propelled cleaning device 220 through the Bluetooth technology. Since the pairing success signal Sa is not received from the cloud server 250, the mobile device 210 can more quickly obtain the pairing success signal Sa.

In an embodiment, after the pairing is completed, the mobile device 210 can directly control the self-propelled cleaning device 220 through the hotspot function of the mobile device 210, such that the application program APP of the mobile device 210 can use the channel established above to issue a cleaning command to the self-propelled cleaning device 220. More specifically, after the application program APP of the mobile device 210 generates the cleaning command signal Sc, the mobile device 210 transmits the cleaning command signal Sc to the cloud server 250 through the mobile communication technology, and after the cloud server 250 transmits the cleaning command signal Sc to the mobile device 210 through the mobile communication technology, and the hotspot function of the mobile device 210 transmits the cleaning command signal Sc to the self-propelled cleaning device 220 through the wireless network technology. In an embodiment, the cleaning command signal Sc includes at least one of a schedule and a cleaning operation command that controls the self-propelled cleaning device 220. In an embodiment, the cleaning device information data includes at least one of a map information, a working status and a power level.

In an embodiment, the self-propelled cleaning device 220 scans the surroundings of the room, obtains a map information, and uploads the map information to the cloud server 250 in real time, and then transmits the map information from the cloud server 250 to the application program APP. In an embodiment, for example, the cleaning command signal Sc includes a map information, a schedule, or information for controlling the movement or operation of the self-propelled cleaning device 220. In an embodiment, the self-propelled cleaning device 220 transmits cleaning device information data such as its cleaning or working status, power level, map, and schedule of scheduled cleaning, to the cloud server 250 through the aforementioned route. In an embodiment, the application program APP of the mobile device 210 downloads the above cleaning device information data from the cloud server 250 to synchronize the self-propelled cleaning device 220 with the application program APP data of the mobile device 210.

In an embodiment, the step in which the self-propelled cleaning device 220 performs cleaning according to the cleaning command signal Sc includes the following steps.

Step S31: the self-propelled cleaning device 220 receives the cleaning command signal Sc.

Step S32: the self-propelled cleaning device 220 responds to the schedule of the cleaning command signal Sc, such that a processor of the self-propelled cleaning device 220 executes the cleaning operation command of the cleaning command signal Sc.

Step S33: the self-propelled cleaning device 220 is enabled to leave a fixed charging stand where the self-propelled cleaning device 220 is parked, according to the schedule of the cleaning command signal Sc, as shown in FIG. 6.

Step S34: navigating is performed on the floor surface of a room.

In an embodiment, the step of receiving, by the mobile device 210, the cleaning device information from the cloud server 250 using the mobile communication technology includes the following step.

Figure 7:
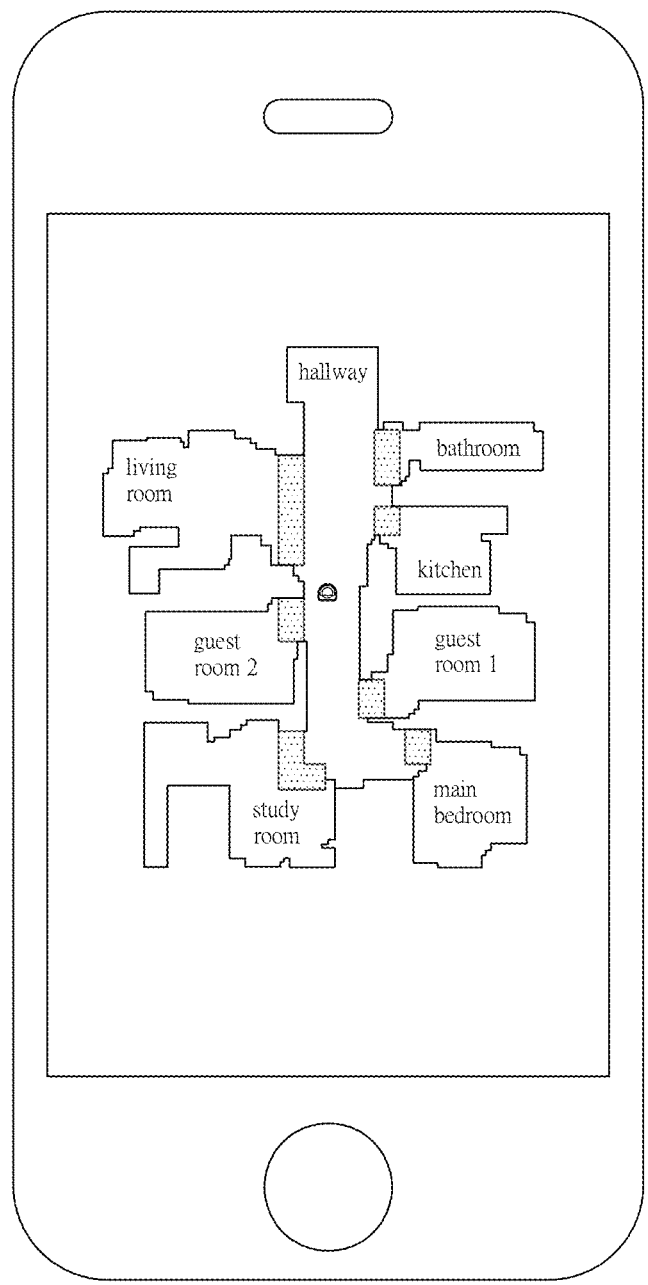
FIG. 7 shows a diagram showing a map, which is measured by the self-propelled cleaning device, on the display of the mobile device according to an embodiment of the present disclosure.

Step S35: the processor of the mobile device executes the cleaning device information dada, and displays the map determined by the self-propelled cleaning device 220 on a display of the mobile device 210 according to the map information of the cleaning device information data, as shown in FIG. 7.

According to the conventional technologies, the mobile phone 110 needs to turn on both the WIFI module and the Bluetooth module, and after confirming that the mobile phone 110 can communicate with the WIFI network device 131, the mobile phone 110 transmits the account name and password of the WIFI network device 131 to the self-propelled cleaning device 120 through the Bluetooth module. Since the hotspot function and the WIFI function of the mobile device 210 cannot be turned on at the same time, or the hotspot function of the mobile device 210 cannot be turned on correctly or in a timely manner, it is impossible to use one mobile phone to enable the self-propelled cleaning device 120 and the mobile phone 110 to communicate with the cloud server 150 through the Internet 140. However, according to an embodiment of the present disclosure, by the appropriate sequence of operations, the same mobile device 210 can be used, such that the self-propelled cleaning device 220 and the mobile device 210 can communicate with the cloud server 250 through the Internet 240 at the same time.

According to the first embodiment of Step S01, the following steps are included.

Step S21: the mobile device 210 turns on the WIFI module of the mobile phone.

Step S22: the self-propelled cleaning device 220 turns on the WIFI module of the cleaning device, and makes the WIFI module of the cleaning device enter the wireless access point mode (AP mode).

Step S23: the mobile device 210 communicates with the self-propelled cleaning device 220 through the wireless network technology, wherein the mobile phone WIFI module of the mobile device 210 is communicated to the cleaning device WIFI module of the self-propelled cleaning device 220 that has entered the AP mode through wireless network technology, and the password of the AP mode of the self-propelled cleaning device 220 is input, such that the mobile device 210 communicates with the self-propelled cleaning device 220 through the wireless network technology.

Step S24: the mobile device 210 opens the application program APP, enters the process of adding a device, enters the account name and password of the hotspot function through the user's manual input or the application program APP automatically entering the account name and password of the hotspot function, and displays the input result of the account name and password of the hotspot function on the image of the application program APP.

Step S25: the mobile device 210 transmits the account name and password of the hotspot function to the self-propelled cleaning device 220 through the AP mode of the WIFI module of the cleaning device by using the WIFI signal.

Step S26: after the self-propelled cleaning device 220 receives the account name and password of the hotspot function of the mobile device 210, it transmits a reception completion signal Sp to the mobile device 210.

Step S27: after the mobile device 210 receives the reception completion signal Sp transmitted by the self-propelled cleaning device 220, the mobile device 210 must enable the hotspot function of the mobile device 210, or the user manually turns on the hotspot function. In an embodiment, the application program APP of the mobile device 210 disables the WIFI module. Depending on the situation and function of the mobile device 210, this step may sometimes be omitted. In addition, in an embodiment, the application program APP of the mobile device 210 detects the enabling of the hotspot detection function, and then waits for the notification from cloud server 250 of the pairing result.

In other words, according to the present disclosure, the step S01 may include: performing, through the wireless network technology, a communication between the mobile device 210 and the self-propelled cleaning device 220 that has entered the AP mode, and transmitting the account name and the password of the hotspot function to the self-propelled cleaning device (Step S31); returning a reception completion signal to the mobile device 210 after the self-propelled cleaning device 220 receives the account name and the password of the hotspot function (Step S32); and enabling the hotspot function of the mobile device 210 or displaying a window asking the user to manually enable the hotspot function after the mobile device 210 receives the reception completion signal returned by the self-propelled cleaning device 220 (Step S33).

According to the present disclosure, the second embodiment of the step S01 includes the following steps.

Figure 5C:
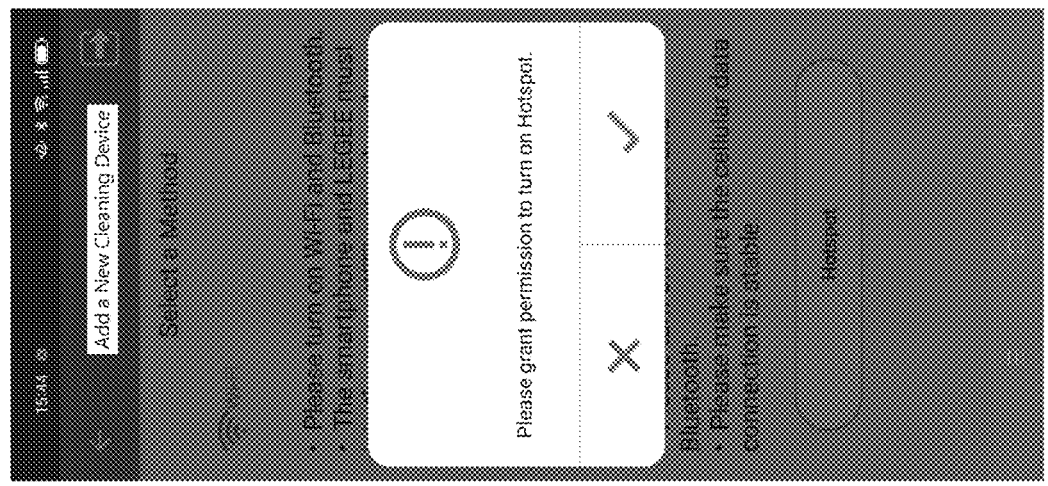
FIGS. 5a-5i are schematic views of a window showing a step of an application program according to an embodiment of the present disclosure.
Figure 5B:
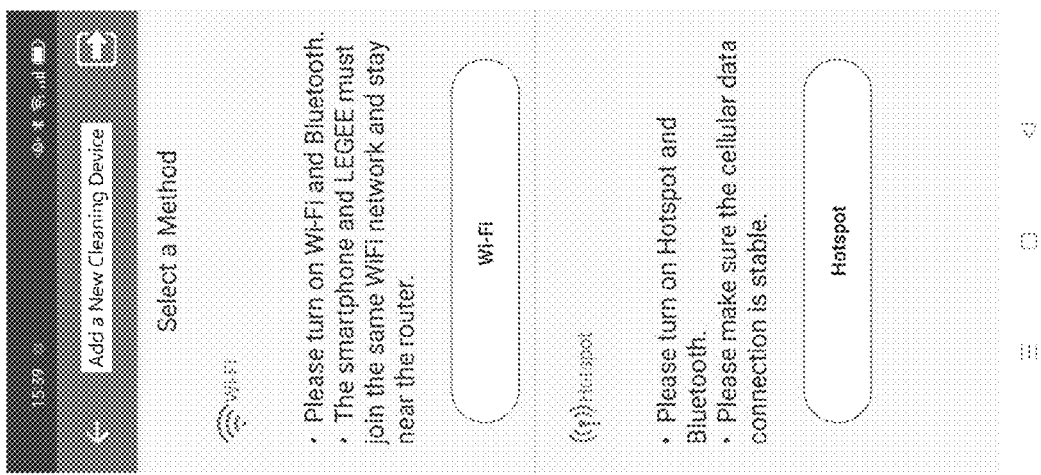
Figure 5A:
Figure 5F:
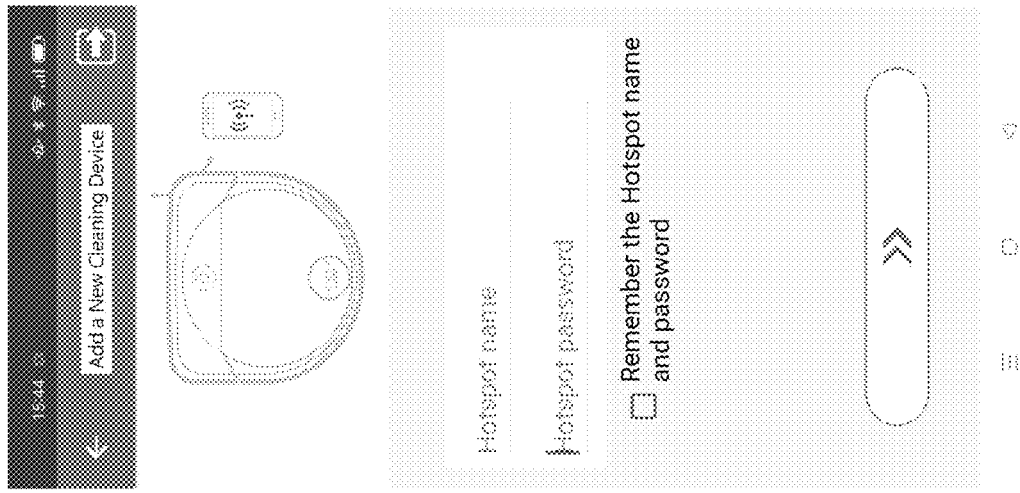
Figure 5E:
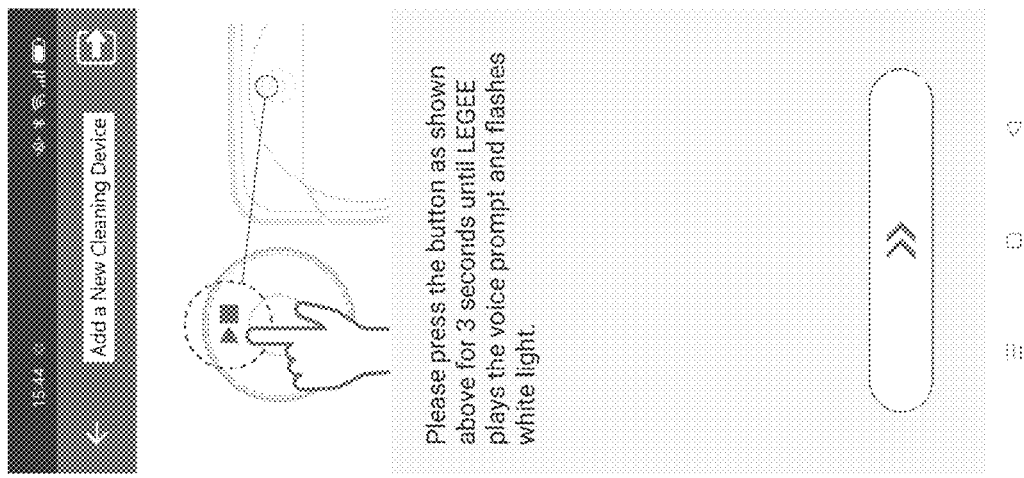
Figure 5D:

Step S41: the application program APP enters the process of adding the self-propelled cleaning device 220, and enables the hotspot function and the Bluetooth function of the mobile phone 210. In an embodiment, the application program APP displays a new device window for the user to add a self-propelled cleaning device 220 to the application program APP (as shown in FIG. 5a). The application program APP displays a connection mode selection window for the user to select a known wifi connection or a hotspot connection according to an embodiment of the present invention (as shown in FIG. 5b). The application program APP displays a function prompt window to remind the user to enable the hotspot function of the mobile device 210 (as shown in FIG. 5c), such that the user can enable the hotspot function of the mobile device 210 through the function prompt window. In an embodiment, the function prompt window can simultaneously remind the user to enable the hotspot function and the bluetooth function of the mobile device 210, thereby enabling the hotspot function and the bluetooth function at the same time. At this time, the prompt window for enabling the bluetooth described later is not required. In an embodiment, preferably, the application APP is used to confirm whether the hotspot function and the Bluetooth function are enabled. If the hotspot function or the Bluetooth function is not enabled, the function prompt window is displayed. The application program APP displays at least one cleaning device prompt window to remind the user to enable at least one of the self-propelled cleaning device 220 and the connection function of the self-propelled cleaning device 220 (as shown in FIG. 5d and FIG. 5e), such that the user can turn on the self-propelled cleaning device 220 and the connection function of the self-propelled cleaning device 220 through the at least one cleaning device prompt window. In an embodiment, preferably, it is confirmed whether the self-propelled cleaning device 220 is enabled. If the self-propelled cleaning device 220 and its connection function are not enabled, the cleaning device prompt window is displayed.

Figure 5I:
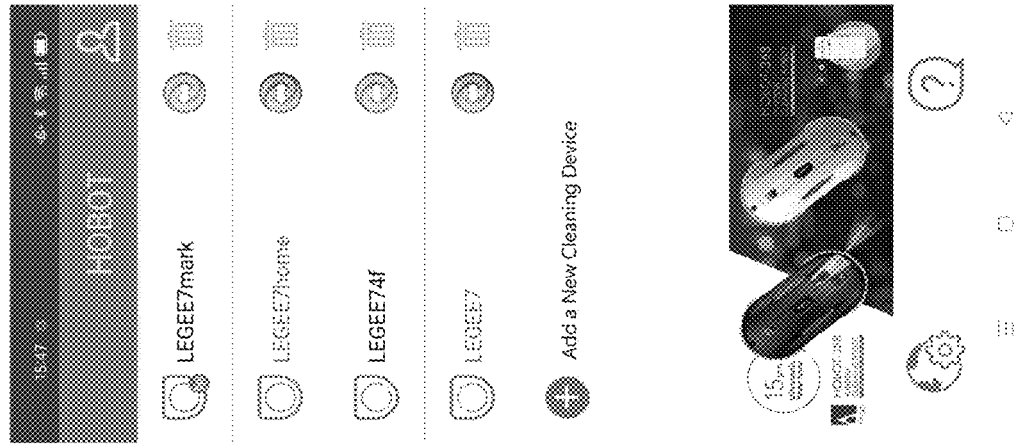
Figure 5H:
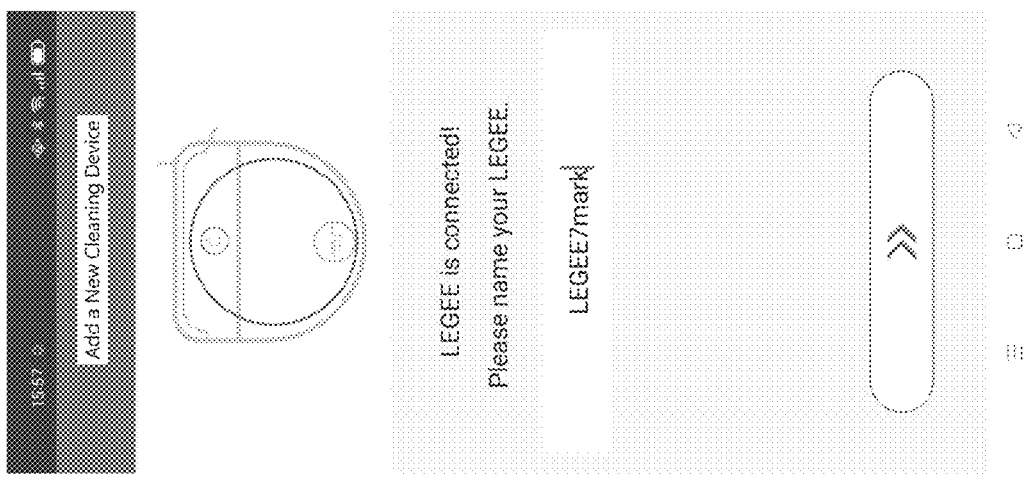
Figure 5G:
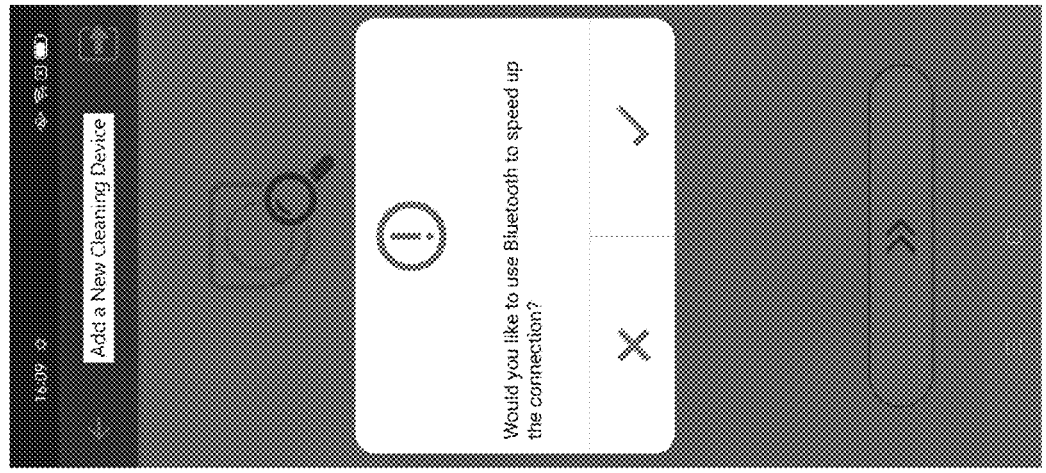

Step S42: the application program APP enters the pairing mode, and the application program APP automatically finds out the account name and password of the hotspot function of the mobile device 210. When the application program APP cannot find out the account name and password of the hotspot function, a window is displayed for the user to manually enter the account name and password of the hotspot function. In an embodiment, the application program APP displays an input window for the user to input the account name and password of the hotspot function of the mobile device 210, or displays the results of the account name and password of the hotspot function searched from the mobile device 210 (as shown in FIG. 5f). In the embodiment in which the function prompt window only prompts the user to enable the hotspot function (as shown in FIG. 5c), after the window for allowing the user to manually input the account name and password of the hotspot function is displayed, another function prompt window is displayed for reminding the user to enable the Bluetooth function (as shown in FIG. 5g).

Figure 8A:
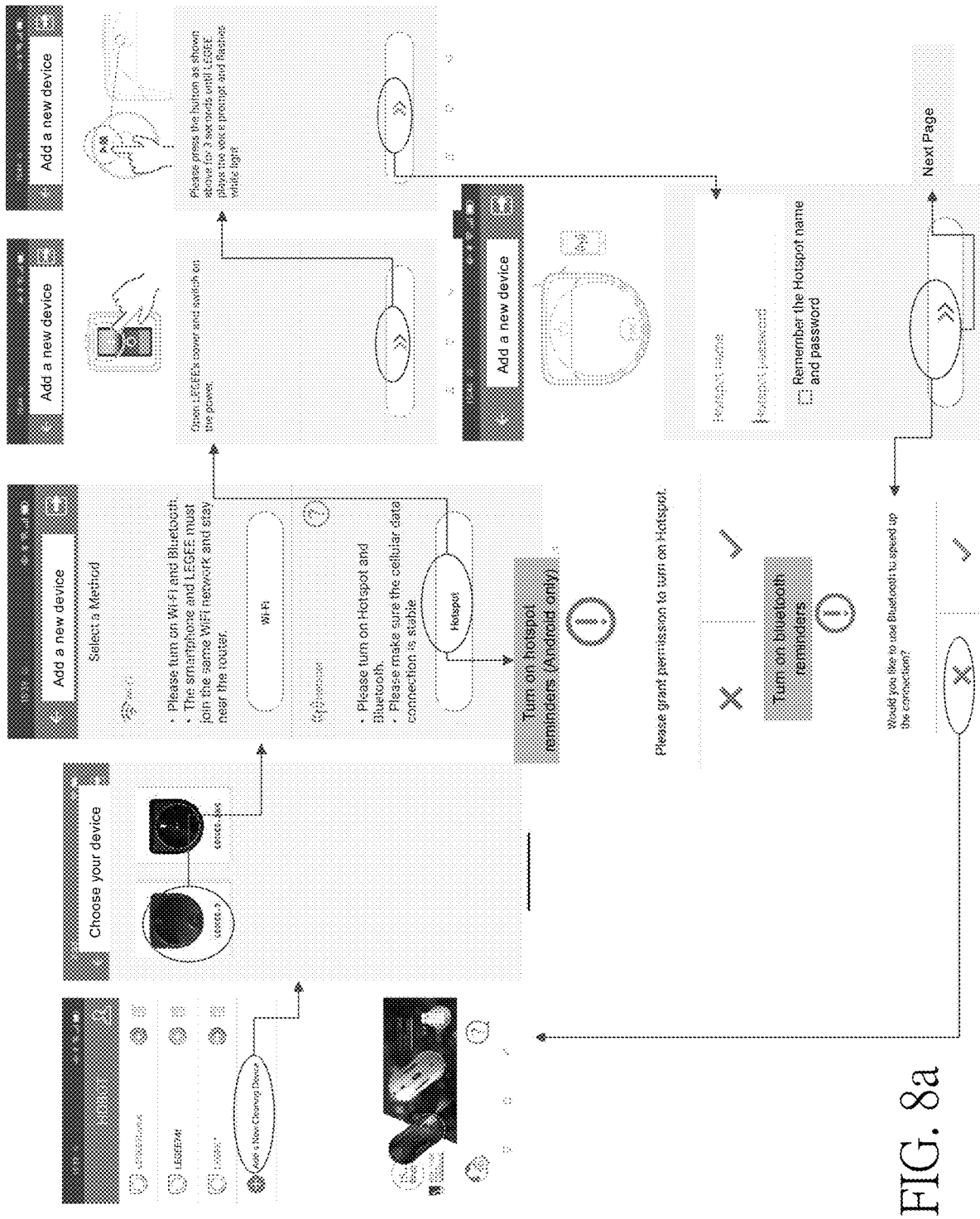
FIGS. 8a-8b are flow diagrams showing windows of each step of the application program according to an embodiment of the present disclosure.
Figure 8B:
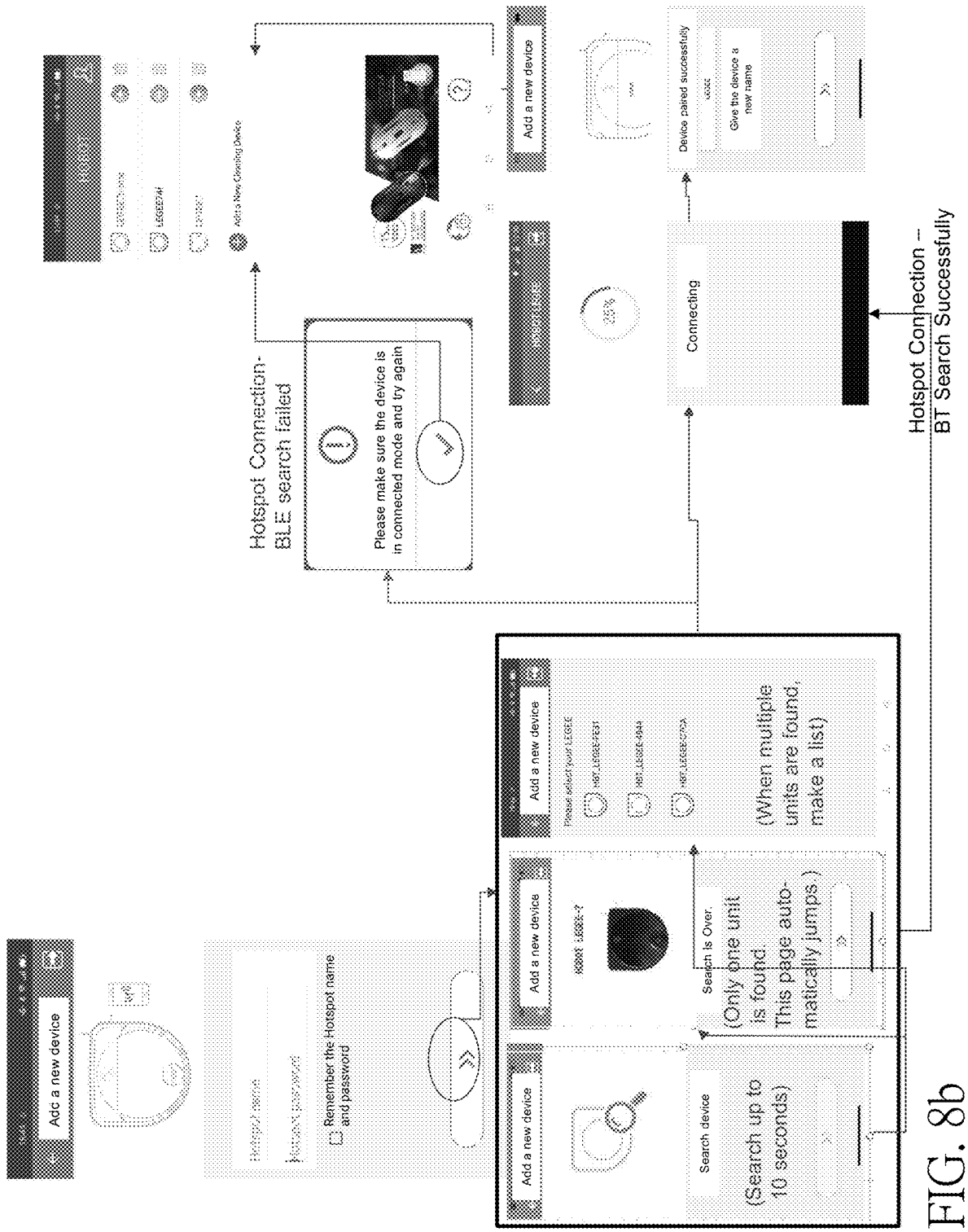

Step S43: the mobile device 210 communicates with the self-propelled cleaning device 220 through the Bluetooth function, and after the mobile device 210 is paired with the self-propelled cleaning device 220 through the Bluetooth technology, the account name and password of the hotspot function are transmitted to the self-propelled cleaning device 220 through the Bluetooth technology. In an embodiment, when the mobile device 210 is paired with the self-propelled cleaning device 220 through the Bluetooth technology, the account name and password of the hotspot function of the mobile device 210 need to be transmitted to the self-propelled cleaning device 220 through the Bluetooth technology, and at the same time, the self-propelled cleaning device 220 does not need to scan the wireless network device, and can directly connect to the hotspot function of the mobile device 210. In an embodiment, the application program APP displays a search completion window to remind the user of the pairing result (as shown in FIG. 5h), and then returns to a cleaning device list window (as shown in FIG. 5i). FIGS. 8a-8b are flow diagrams showing windows of each step of the application program according to an embodiment of the present disclosure. In an embodiment, referring to FIGS. 8a to 8b, each step and related flow of the control method for the automatic cleaning device can be more clearly understood from FIGS. 8a to 8b.

In an embodiment, the mobile device 210 communicates with the self-propelled cleaning device 220 through the Bluetooth function in Step S43; or the mobile device 210 communicates with the self-propelled cleaning device 220 through wireless network technology in Step S23. Further, the following steps are included.

Step S51: the self-propelled cleaning device 220 sends out a pairing signal with a preset name.

Step S52: the mobile device 210 searches all pairing signals around the mobile device 210 and selects to receive the pairing signal with the preset name.

Step S53: the mobile device 210 stores the selected and received pairing signal with the preset name in the memory of the mobile device 210, and the mobile device 210 is directly paired with the self-propelled cleaning device 220. Alternatively, the pairing signal is displayed on the display of the mobile device 210 for the user to select the self-propelled cleaning device 220. Preferably, when the mobile device 210 only finds out a pairing signal, the mobile device 210 is directly paired with the self-propelled cleaning device 220. However, when the mobile device 210 finds out multiple pairing signals (i.e., these pairing signals include signals of other devices), the pairing signals are displayed on the display of the mobile device 210 for the user to select the self-propelled cleaning device 220.

According to the foregoing embodiments of the present disclosure, a control method for an automatic cleaning equipment is provided, wherein the mobile device 210 is used as a wireless network device, the self-propelled cleaning device 220 communicates with the mobile device 210 through wireless network technology, then the self-propelled cleaning device 220 communicates with the cloud server 250 through the mobile communication function of the mobile device 210 by the mobile communication technology, and at the same time, the mobile device 210 communicates with the cloud server 250 through the mobile communication technology, such that the mobile device 210 communicates with the self-propelled cleaning device 220 through the cloud server 250 so as to control the self-propelled cleaning device 220. In an embodiment, multiple guide windows are displayed through the application program APP, prompting the user to enable the required function at an appropriate time point, so as to facilitate the user to set the connection.

What is claimed is:

1. A control method for an automatic cleaning equipment, which includes a mobile device and a self-propelled cleaning device, wherein the mobile device has a hotspot function and a mobile communication function, the control method comprising steps of:

transmitting, by the mobile device, an account name and a password of the hotspot function to the self-propelled cleaning device, and enabling the hotspot function of the mobile device;

using, by the self-propelled cleaning device, the account name and the password of the hotspot function to communicate with the mobile device using a wireless network technology through the hotspot function of the mobile device, and then communicating with a cloud server via a mobile communication technology through the mobile communication function of the mobile device;

communicating, by the mobile device, with the cloud server through the mobile communication technology;

receiving, by the mobile device, a pairing success signal from the cloud server, wherein the paring success signal indicates that both the mobile device and the self-propelled cleaning device are capable of communicating with the cloud server; and transmitting, by the mobile device, a cleaning command signal to the self-propelled cleaning device through the cloud server, so as to control the self-propelled cleaning device such that the self-propelled cleaning device performs cleaning according to the cleaning command signal, wherein the cleaning command signal is transmitted to the cloud server by the mobile device using the mobile communication technology, then received by the mobile device from the cloud server using the mobile communication technology, and then transmitted to the self-propelled cleaning device by the mobile device using the wireless network technology.

2. The control method according to claim 1, wherein the mobile device is installed with an application program, and the mobile device guides an execution of the control method for the automatic cleaning equipment through the application program.

3. The control method according to claim 1, further comprising steps of:
obtaining, by the self-propelled cleaning device, a cleaning device information, and transmitting the cleaning device information to the cloud server, wherein the cleaning device information is transmitted to the mobile device by the self-propelled cleaning device through the hotspot function of the mobile device using the wireless network technology, and then transmitted to the cloud server by the mobile device through the mobile communication function using the mobile communication technology; and
receiving, by the mobile device, the cleaning device information from the cloud server using the mobile communication technology.

4. The control method according to claim 3, wherein the cleaning command signal includes at least one of a schedule and a cleaning operation command that controls the self-propelled cleaning device, and the cleaning device information includes at least one of a map information, a working status and a power level.

5. The control method according to claim 4, wherein the cleaning command signal includes the schedule and the cleaning operation command that controls the self-propelled cleaning device, and the step in which the self-propelled cleaning device performs cleaning according to the cleaning command signal includes steps of:
receiving, by the self-propelled cleaning device, the cleaning command signal;
responding, by the self-propelled cleaning device, to the schedule of the cleaning command signal, such that a processor of the self-propelled cleaning device executes the cleaning operation command;
enabling the self-propelled cleaning device to leave a fixed charging stand where the self-propelled cleaning device is parked, according to the schedule of the cleaning command signal; and
navigating on the floor surface of a room.

6. The control method according to claim 5, wherein the cleaning device information includes the map information, and the step of receiving, by the mobile device, the cleaning device information from the cloud server using the mobile communication technology includes:
executing, by the processor of the mobile device, the cleaning device information, and displaying a map determined by the self-propelled cleaning device on a display of the mobile device according to the map information.

7. The control method according to claim 2, wherein the mobile device has a Bluetooth function, and the step of transmitting, by the mobile device, the account name and the password of the hotspot function to the self-propelled cleaning device and enabling the hotspot function of the mobile device comprises:
displaying, by the application program, a function prompt window to remind the user to enable the hotspot function and Bluetooth function of the mobile device.

8. The control method according to claim 7, wherein the step of transmitting, by the mobile device, the account name and the password of the hotspot function to the self-propelled cleaning device and enabling the hotspot function of the mobile device further comprises:
displaying, by the application program, at least one cleaning device prompt window to remind the user to turn on at least one of the self-propelled cleaning device and connection functions of the self-propelled cleaning device; and
displaying, by the application program, an input window for the user to input the account name and password of the hotspot function of the mobile device; or to display a result showing the account name and password of the hotspot function searched by the mobile device.

9. The control method according to claim 8, wherein the step of transmitting, by the mobile device, the account name and the password of the hotspot function to the self-propelled cleaning device and enabling the hotspot function of the mobile device further comprises steps of:
pairing the mobile device with the self-propelled cleaning device through the Bluetooth function, and transmitting the account name and the password of the hotspot function to the self-propelled cleaning device through a Bluetooth technology.

10. The control method according to claim 1, wherein the step of transmitting, by the mobile device, the account name and the password of the hotspot function to the self-propelled cleaning device and enabling the hotspot function of the mobile device further comprises steps of:
performing, through the wireless network technology, a communication between the mobile device and the self-propelled cleaning device that has entered a wireless access point AP mode, and transmitting the account name and the password of the hotspot function to the self-propelled cleaning device through the wireless network technology;
returning a reception completion signal to the mobile device after the self-propelled cleaning device receives the account name and the password of the hotspot function; and
enabling the hotspot function of the mobile device or displaying a window asking the user to manually enable the hotspot function after the mobile device receives the reception completion signal returned by the self-propelled cleaning device.

11. The control method according to claim 1, wherein the mobile device has a Bluetooth function, and the step of transmitting, by the mobile device, the account name and the password of the hotspot function to the self-propelled cleaning device and enabling the hotspot function of the mobile device comprises:
pairing the mobile device with the self-propelled cleaning device through the Bluetooth function, and transmitting the account name and the password of the hotspot function to the self-propelled cleaning device through a Bluetooth technology.

12. The control method according to claim 1, wherein the step of receiving, by the mobile device, the pairing success signal from the cloud server comprises steps of:
receiving, by the self-propelled cleaning device, the pairing success signal from the cloud server through the hotspot function of the mobile device; and
receiving, by the mobile device, the pairing success signal from the self-propelled cleaning device without using the cloud server.

13. The control method according to claim 3, wherein the step of receiving, by the mobile device, the pairing success signal from the cloud server comprises:

receiving, by the mobile device, the pairing success signal from the cloud server.

14. The control method according to claim 13, wherein the pairing success signal includes an identification code specifically assigned to the self-propelled cleaning device by the cloud server, after providing the identification code to the cloud server, the mobile device receives the cleaning device information belonging to the identification code provided by the cloud server from the cloud server, and after providing the identification code to the cloud server, the self-propelled cleaning device receives the cleaning command signal belonging to the identification code provided by the cloud server from the cloud server.

* * * * *